United States Patent Office

3,486,845
Patented Dec. 30, 1969

3,486,845
BENEFICIATION OF CRYOLITE MATERIAL
Donald Otis Vancil and Maurice Clark Harrison, Longview, Wash., assignors to Reynolds Metals Company, Richmond, Va., a corporation of Delaware
No Drawing. Filed Nov. 22, 1966, Ser. No. 596,057
Int. Cl. C01f 7/50
U.S. Cl. 23—88     11 Claims

ABSTRACT OF THE DISCLOSURE

Cryolite having a weight ratio of NaF to $AlF_3$ less than 1.5 useful as an additive for alumina reduction cells, is prepared by reacting cryolite material in the presence of reactive alumina with an acid reactant such as hydrofluosilicic acid or the alkali salts thereof, the amount of reactive alumina being sufficient to adjust the Na:Al molar ratio of the cryolite material to less than 3:1.

---

This invention relates to the beneficiation of cryolite materials. More particularly, the invention concerns a method of lowering the $NaF/AlF_3$ weight ratio of cryolite material, and to the utilization of such lower ratio cryolite in the operation of alumina reduction cells.

In natural cryolite ($Na_3AlF_6$), the weight ratio of NaF to $AlF_3$ is close to 1.5 to 1. In synthetic cryolites, including those produced by off-gas recovery processes which involve reacting sodium fluoride solution and sodium aluminate solution, followed by precipitation of the cryolite by the introduction of carbon dioxide gas, the products are usually characterized by a weight ratio of NaF to $AlF_3$ much in excess of 1.5, and which may run as high as 1.9, as well as by substantial silica contamination. The hypothetical reaction for the foregoing synthesis is:

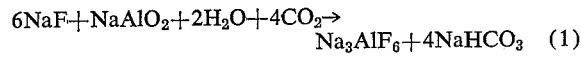

$$6NaF + NaAlO_2 + 2H_2O + 4CO_2 \rightarrow Na_3AlF_6 + 4NaHCO_3 \quad (1)$$

Such synthetic cryolite may also contain substantial amounts of alumina and sodium carbonate, sometimes in the form of Dawsonite $Al_2O_3 \cdot Na_2CO_3$, and is thus alkaline in character.

During the operation of alumina reduction cells, the molten cryolite electrolyte gradually becomes depleted in fluoride content, by vaporization of components rich in aluminum fluoride. At the same time cryolite components rich in sodium are absorbed into the carbonaceous cathode of the reduction cell. Since it is generally considered desirable to maintain the NaF to $AlF_3$ weight ratio of the electrolyte within the range of about 1.3 to 1.5 for optimum cell operation, soda ash may be added during this period to replace the excess sodium collected in the cathode, and alkaline cryolite is advantageously used for this purpose. This phase of operation will usually occur within six to twelve months after a new cell is placed in use.

For the remaining two to three years of cell life it becomes necessary periodically to add aluminum fluoride and cryolite to match the composition of the vaporization losses. Where the make-up cryolite contains excess sodium fluoride, or sodium oxide, hydroxide or carbonate values, even greater amounts of expensive aluminum fluoride must be added to preserve the ratio. Thus, during the greater part of the operating life of an alumina reduction cell, both cryolite and aluminum fluoride must be supplied to the cell, necessitating the maintenance or inventories of such compounds, and increasing the cost of operation.

It is also customary to recover fluorine values from cell waste gases, and from used pot linings and other materials employed in the cells. This is usually accomplished by employing a caustic aluminate leach liquor, followed by carbonation to precipitate synthetic cryolite. The resulting cryolite is also alkaline and of limited usefulness.

It has been proposed in the prior art to beneficiate synthetic cryolite so as to raise its fluoride content and lower its silica content by reacting the precipitated cryolite with a soluble fluoride or with hydrofluoric acid, at elevated temperature, for a period of ½ to 1½ hours, and a method of this type is described in Gernes, U.S. Patent 3,061,411. Under these conditions, however, the weight ratio of NaF to $AlF_3$ is only slightly lowered, and in any event, remains in the range of 1.65 to 1.73, or well above the value of 1.5, so that the cryolite retains its essentially alkaline character.

Accordingly, the problem of providing a cryolite having a low $NaF/AlF_3$ weight ratio, and which would be of great value as an additive to alumina reduction cells in maintaining the optimum ratio of NaF to $AlF_3$ in the electrolyte, as well as for other purposes, remained unsolved prior to the present invention.

In accordance with the present invention there is provided a novel method whereby a cryolite material having excess sodium may be beneficiated and converted to a more desirable low ratio cryolite material, and, particularly, to a beneficiated cryolite having a weight ratio of NaF to $AlF_3$ of less than 1.5, by reacting said cryolite material with a fluosiliceous acid reactant such as fluosilicic acid, or an alkali fluosilicate, such as sodium fluosilicate, in the presence of reactive alumina.

In the aluminum industry, and for purposes of this invention, the term cryolite material is employed to denote a range of materials comprising mixtures of NaF and $AlF_3$ or one or more of the double salts of NaF and $AlF_3$, which double salts may also contain uncombined NaF or $AlF_3$. The cryolite materials are usually characterized by the ratio of the total weight of NaF contained in a given quantity to the total weight of $AlF_3$ present, without regard to the presence or absence of chemical bonding between the NaF and $AlF_3$. The value of this weight ratio for naturally occurring cryolite is about 1.5, in good agreement with the weight ratio of the molecular double salt $3NaF \cdot AlF_3$. X-ray and other evidence indicates the existence of two other double salts, $5NaF \cdot 3AlF_3$ (weight ratio 0.833), and $NaF \cdot AlF_3$ (weight ratio 0.5).

It is also common in the aluminum industry to characterize cryolite materials by their "percent excess $AlF_3$" or "percent excess NaF," which terms are defined as the percent $AlF_3$ (or NaF) percent in the material in excess of the amount required to form, with the NaF (or $AlF_3$) present, a cryolite of weight ratio 1.5. Thus, the double salts $5NaF \cdot 3AlF_3$ and $NaF \cdot AlF_3$ would be described as having about 24.2 and 44.4 percent excess $AlF_3$, respectively.

The cryolite material amenable to the treatment of the invention may be derived from any suitable source, including synthetic cryolite prepared as previously described, as by direct precipitation or by recovery from reduction cell waste gases, or from cell linings and electrodes. Natural (Greenland) cryolite can also have its weight ratio of $NaF/AlF_3$ lowered by the method of the invention.

The reactive alumina should be in a form which is readily attacked by the acid reactant, as for example, Bayer process alumina trihydrate, sodium aluminate, aluminum hydroxide, or the mineral Dawsonite ($Al_2O_3 \cdot Na_2CO_3$) which is commonly present in alkaline cryolite materials which have been precipitated by the reaction of carbon dioxide on caustic-fluoride solutions containing an excess of alumina.

Thus, for example, if it is desired to reduce the ratio of relatively pure cryolite, the appropriate amount of Dawsonite, or prefereably freshly precipitated alumina trihydrate, may be added to the water slurry of the cryolite.

If desired, alumina in excess of the amount required for reaction (1) above may be added at any point in the cryolite production system where such alumina might reasonably be present, or be produced either ahead of, or in, the carbonation equipment used for reaction (1).

A unique feature of the method of the invention lies in the fact that the beneficiated cryolite material is recovered as a solid, while the impurities, and particularly silica impurities, are either taken into solution or remain in solution. The beneficiated cryolite material may then be readily filtered, leaving the sodium and silica in solution.

There is advantageously employed a sufficient amount of reactive alumina for reaction with substantially all of the fluorine values contained in the acid reactant, preferably an excess of about 2 to 10% alumina in order to achieve optimum recovery of fluorine. The fluosilicic acid or alkali fluosilicate should preferably contain a minimal amount of phosphorus compounds since these tend to collect in the cryolite product with resultant detriment to reduction cell operation. Where fluosilicic acid contains excessive amounts of $P_2O_5$, it can be purified by treatment with a sodium compound to precipitate sodium fluosilicate therefrom, which salt comes down substantially uncontaminated, with the phosphoric acid remaining in solution. The sodium fluosilicate thus obtained, being a strongly acidic salt, can then be employed in lieu of fluosilicic acid.

The use of fluosilicic acid typically produces a decrease in silica content of the cryolite material to less than half the original content, e.g. from 0.46% to 0.20%. It is paradoxical that an acid containing more than 40% silica as $SiO_2$ can thus be employed to remove silica from the cryolite material, and this points up a novel and unexpected feature of the invention. Sodium fluosilicate may be employed similarly for treatment of cryolite material by first digesting such material with sodium fluosilicate solution, then decanting the liquor containing the silicic acid, and removing the beneficiated cryolite material. The silica content can be further reduced by washing this material with water containing a small amount of HF, at about 85° C. or higher. This process is illustrated in Example 3 below.

It is believed that the reactive alumina (together with excess sodium present) is converted to a useful lower ratio cryolite material, e.g. chiolite $Na_5Al_3F_{14}$, in accordance with the hypothetical reaction:

$$9Al_2O_3 + 14H_2SiF_6 + 15Na_2CO_3 \rightarrow 6Na_5Al_3F_{14} + 14H_2SiO_3 + 15CO_2 \quad (2)$$

Or, when treating cryolite material having a 2.5 weight ratio of NaF to $AlF_3$, for example, to produce beneficiated cryolite of 1.0 ratio, the reaction may be as follows:

$$4(5NaF \cdot AlF_3) + 3Al_2O_3 + 3H_2SiF_6 \rightarrow 10(2NaF \cdot AlF_3) + 3H_2SiO_3 \quad (2a)$$

It can be seen therefore, that, depending upon the amount of $Na_2CO_3$ or other excess sodium values present in the initial cryolite material, the weight proportions of reactive alumina and acid reactant can be estimated in advance. On the other hand, if sufficient reactive alumina is provided to adjust the Na:Al molar ratio of the cryolite material to the desired value less than 3:1, as previously discussed, the reaction can be carried out effectively simply by introducing the acid reactant until stabilization of the pH indicates completion of the reaction. The proportions of acid reactant and reactive alumina can be varied as required to approach the optimum final pH of about 6.0 to 6.5. If too much acid is introduced, so that the pH falls lower than desired, this can be compensated by introducing an additional amount of cryolite material containing Dawsonite, or other source of reactive alumina and a sodium compound.

The reaction time will be upwards of about 20 minutes, depending somewhat upon the proportion of acid added and the nature of the material treated. When the pH of the slurry after admixing the acid reactant and allowing time for reaction has reached about 6.0 to 6.5, it is found that about 90 to 98 percent of the fluorine originally present is contained in the insoluble low-ratio cryolite material produced.

It is necessary to have the final pH of the slurry within the range of about 4.8 to 6.7 in order to maintain silica of the fluosilicic acid in solution while the cryolite precipitates. It is also preferable to wash the product by repulping with water and refiltering, to remove entrained mother liquor and thereby lower the silica content of the cryolite product from a previous level of 0.4–0.5% to 0.2% or less. By thus controlling the pH, it is possible to utilize the fluorine from the $H_2SiF_6$ (or the sodium and fluorine from the $Na_2SiF_6$), as well as excess sodium values in the initial cryolite material, while leaving the silica in solution. The final pH appears to have a definite relation to the $NaF/AlF_3$ ratio, as well as being critical to the solubilizing of the silica.

The acid reactant treatment temperatures ordinarily will be in the range of about 70° to 100° C., preferably about 85° to 90° C.

After the digestion period is completed, the cryolite product is filtered, and may be dried at not more than about 450° C., depending upon the use to which the cryolite is to be put.

The following examples illustrate the practice of the invention, but are not to be regarded as limiting:

EXAMPLE 1

Treatment with $H_2SiF_6$ 400 g. of synthetic cryolite made by reaction of sodium fluoride and sodium aluminate followed by carbonation, having an $NaF/AlF_3$ weight ratio of 2.59 (and containing 19.3% excess $Al_2O_3$ and 19.1% excess $Na_2CO_3$) was digested with 1500 ml. of 85 g./l. $H_2SiF_6$ solution for 20 minutes at 95° C., the pH rising from 4.8 to 6.6. Comparative analyses showed:

TABLE 2

| Sample | Percent F | Percent $SiO_2$ | Percent $Fe_2O_3$ | Percent $Na_2SO_4$ | $NaF/AlF_3$ wt. ratio |
|---|---|---|---|---|---|
| Untreated | 26.06 | 0.46 | .06 | 1.35 | 2.59 |
| Treated | 56.03 | 0.18 | .04 | 0.13 | 0.81 |

EXAMPLE 2

Treatment with $H_2SiF_6$ 10 g. of dried cryolite material from carbonation of the reaction product of NaF and $NaAlO_2$, having an $NaF/AlF_3$ weight ratio of 2.59 (and containing 19.1% $Na_2CO_3$ and 19.8% $Al_2O_3$), presumably as Dawsonite, together with 0.46% $SiO_2$ equivalent, 1.35% $Na_2SO_4$, 0.06% $Fe_2O_3$ equivalent, balance $Na_3AlF_6$, was digested with 30 cc. of an 85 g.p.l. $H_2SiF_6$ solution for 30 minutes at 90° C. The resulting slurry, which had a pH of 6.50, was filtered in a Buchner funnel, yielding a filtrate containing about 2.4% of the total fluorine initially added and substantially all of the silica, sodium sulfate, and iron values added with the reactants. The filter cake when dried for one hour at 400° C. weighed 8.4 g., and had a weight ratio of $NaF/AlF_3$ of 0.90, corresponding to 21% excess $AlF_3$. Impurities in the cake were $SiO_2$ 0.17%, $P_2O_5$ 0.105%, $Na_2SO_4$ 0.13%, and $Fe_2O_3$ 0.04%. About 0.76% of the initial fluorine added was lost during drying, giving a total fluorine recovery of 96.7%, with total fluorine lost in reaction 3.24%.

The beneficiated cryolite material contained about 93% cryolite, with a weight ratio of $NaF/AlF_3$ of 0.9, and about 7% unreacted $Al_2O_3$. It is excellently suited for use in alumina reduction cells. Because of the low weight ratio of the product, which is very near to the weight ratio lost by vaporization from reduction cells, the cryolite product can be used advantageously to maintain the proper weight ratio of cell electrolyte, thus doing away with the present practice of separately adding fresh high-ratio cryolite and aluminum fluoride to such cells.

EXAMPLE 3

Treatment with $Na_2SiF_6$ 400 g. of synthetic cryolite prepared as in Example 1 was digested with 260 g. $Na_2SiF_6$ in 2500 ml. water for 20 minutes at 85° C. The product settled at the rate of 2 inches per minute. After settling, it was decanted and washed for 10 minutes with 12 g. HF in 1 liter of water at 85° C., and the sample filtered. The comparative analyses were as follows:

TABLE 3

| Sample | Percent F | Percent $SiO_2$ | Percent $Fe_2O_3$ | Percent $Na_2SO_4$ | $NaF/AlF_3$ wt. ratio |
|---|---|---|---|---|---|
| Untreated | 26.06 | 0.46 | 0.06 | 1.35 | 2.59 |
| Treated | 53.80 | 0.18 | 0.03 | 0.38 | 1.22 |

EXAMPLE 4

Treatment of residue black mud

From pot lining caustic extraction with $H_2SiF_6$

Reduction cell potliner material (viz. insoluble residue following caustic soda extraction of pot lining to recover cryolite) containing 35% $Al_2O_3$, 1.75% caustic soluble F, 8% $CaF_2$, 1.5% $Fe_2O_3$, and 5% $SiO_2$, was pelletized with $Na_2CO_3$, and calcined at 1100° C., to obtain, after leaching with water, a product practically free from $Fe_2O_3$, but heavily contaminated with $Na_2CO_3$ and $SiO_2$. The amount of $Na_2CO_3$ was regulated so as to be sufficient for the production of low ratio cryolite. The reaction may be represented by the equation:

$$2Na_2CO_3 + CaF_2 + SiO_2 + Al_2O_3$$
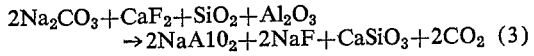
$$\rightarrow 2NaAlO_2 + 2NaF + CaSiO_3 + 2CO_2 \quad (3)$$

The presence of the correct excess of $Na_2CO_3$ in the calcination product permits reaction of all of the sodium present with $H_2SiF_6$, in accordance with reaction (2) above.

While the presently preferred practices of the invention have been described, it will be apparent that the invention may be otherwise variously embodied and practiced within the scope of the following claims.

What is claimed is:

1. Method of lowering the $NaF/AlF_3$ ratio of cryolite material, which comprises reacting said cryolite material in the presence of reactive alumina with an acid reactant selected from the group consisting of fluosilicic acid and the alkali salts thereof, the amount of reactive alumina being sufficient to adjust the Na:Al molar ratio of said cryolite material to less than 3:1, said acid reactant being introduced in an amount such that the reaction mixture reaches a stabilized pH in the range from about 4.8 to about 6.7.

2. The method of claim 1 in which the initial cryolite material comprises an alkaline synthetic cryolite.

3. The method of claim 1 in which the initial cryolite material comprises a synthetic cryolite containing reactive alumina and sodium carbonate.

4. The method of claim 1 in which said acid reactant is fluosilicic acid.

5. The method of claim 1 in which said acid reactant is sodium fluosilicate.

6. The method of claim 1 in which an amount of acid reactant is employed to provide the additional fluorine needed to form cryolite material of the desired $NaF/AlF_3$ ratio.

7. The method of claim 6 in which the amount of reactive alumina employed is about 2 to 10% by weight (dry basis) in excess of that required to combine with fluorine to form said cryolite material.

8. The method of claim 1 in which the reactive alumina is introduced together with the acid reactant.

9. The method of claim 1 in which the reactive alumina is introduced during the preparation of the initial cryolite material.

10. The method of claim 1 in which the reaction temperature is between about 70° and 100° C.

11. The method of claim 1 in which the $NaF/AlF_3$ weight ratio of the resulting cryolite material is less than 1.5 to 1.

References Cited

UNITED STATES PATENTS

| 2,186,433 | 1/1940 | Schwemmer | 23—88 |
| 2,790,705 | 4/1957 | Kean et al. | 23—88 |
| 2,842,426 | 7/1958 | Glocker | 23—88 |
| 2,916,352 | 12/1959 | Fitch et al. | 23—88 |
| 2,996,355 | 8/1961 | Kamlet | 23—88 |
| 3,049,405 | 8/1962 | Trupiano et al. | 23—88 |
| 3,057,681 | 10/1962 | Gernes et al. | 23—88 |
| 3,128,151 | 4/1964 | Zanon et al. | 23—88 |
| 3,175,882 | 3/1965 | Derr | 23—88 |

EDWARD STERN, Primary Examiner

U.S. Cl. X.R.

23—64, 110, 150, 182